US008434920B2

(12) United States Patent
Jones

(10) Patent No.: US 8,434,920 B2
(45) Date of Patent: May 7, 2013

(54) AERIALLY DEPLOYED ILLUMINATION SYSTEM

(76) Inventor: Kenneth R Jones, Wayne, NJ (US)

( * ) Notice: Subject to any disclaimer, the term of this patent is extended or adjusted under 35 U.S.C. 154(b) by 113 days.

(21) Appl. No.: 13/211,483

(22) Filed: Aug. 17, 2011

(65) Prior Publication Data

US 2012/0044710 A1  Feb. 23, 2012

Related U.S. Application Data

(60) Provisional application No. 61/374,591, filed on Aug. 17, 2010.

(51) Int. Cl.
*F21V 1/20* (2006.01)

(52) U.S. Cl.
USPC .............. 362/470; 362/233; 362/85; 382/103

(58) Field of Classification Search .................. 362/470, 362/233, 85; 382/103
See application file for complete search history.

(56) References Cited

U.S. PATENT DOCUMENTS

| 2007/0269077 A1* | 11/2007 | Neff et al. ..................... 382/103 |
| 2010/0025582 A1* | 2/2010 | Weil ............................. 250/332 |
| 2013/0004017 A1* | 1/2013 | Medasani et al. ............. 382/103 |

* cited by examiner

*Primary Examiner* — Ali Alavi
(74) *Attorney, Agent, or Firm* — The McHattie Law Firm

(57) ABSTRACT

An aerially deployed illumination system is provided which may be remotely operated or preprogrammed to illuminate a designated target, such as a geographic area, vehicle, or personnel. In particular, a remotely controlled UAV having an illumination system disposed thereon is provided, the illumination system comprised of a concentrated light source and light movement apparatus operable to rapidly scan the target with the light source, thereby providing an illusion of a large area of illumination. Preferably, a line is created from the light source, the line being rapidly moved over the target in specific patterns and at specific frequencies. The system may further include a plurality of UAV's capable of ad hoc networking, so as to illuminate both large areas, as well as stationary and moving targets. In addition, the UAV's having an illumination system disposed thereon may be disposed within a projectile, the projectile tube or gun launched, and the UAV ejected from the projectile over a designated target, thereby enabling quick delivery of the UAV to an area of interest.

9 Claims, 17 Drawing Sheets

AERIALLY DEPLOYED ILLUMINATION SYSTEM

REFERENCE TO RELATED APPLICATION

This application is a non-provisional application corresponding to and claiming priority of prior filed U.S. provisional application Ser. No. 61/374,591, filed Aug. 17, 2011, the contents of which is hereby incorporated by reference.

BACKGROUND OF THE INVENTION

1. Field of the Invention

The present invention provides an aerially deployed illumination system which may be tube or gun launched, or deployed on an unmanned aerial vehicle (UAV), which may be remotely operated and/or preprogrammed to illuminate a designated geographic area, structure, vehicle or personnel. In particular, an unmanned aerial vehicle (UAV) deployed or tube/gun launched illumination system is provided, wherein a relatively light weight, low power, concentrated light source disposed on the UAV or launched from a land based platform such as a mortar tube, artillery gun, rocket launcher or tube launch system, is operable to illuminate an area via rapid scanning of the area by an illumination control system.

2. Description of the Related Art

Unmanned aerial vehicles (UAV's), including balloon-based vehicles, gas and electric powered fixed-wing craft, and rotating blade equipped (helicopter) vehicles, have been conventionally deployed for various operations, including surveillance, combat operations and commercial applications. However, such UAV's generally have a fairly small payload capacity, due to their light weight and low fuel/power capability. Thus, the capabilities of UAV's are fairly limited due to limitations in payload and range, the range thereof being dramatically impacted by increases in payload.

With regards to UAV deployed means of illumination, currently, Peak Beam® is developing a UAV deployed means of illumination. In particular, Peak Beam® is developing a UAV-mounted xenon-light system capable of personnel immobilization. However, such lighting/illumination systems are heavy, and thus require a large UAV platform for deployment thereof. Further, it is believed that such a system is manually operated, and has a limited range and time on station. Moreover, it is not a battlefield lighting system, but rather a non-lethal weapon operable to create a dazzler effect like a laser dazzler to "flash blind" and subdue.

Conventionally, as disclosed in U.S. Patent Publication No. 2010/0034424, lasers have been deployed upon UAV's as laser designators for targeting systems. However, such laser designators are incapable of illuminating a wide area for visible viewing of a target. Further, as disclosed in U.S. Pat. No. 7,111,943, modulated light beam generating apparatuses have been developed for creating images using a modulated laser light and lens system. Such apparatuses, however, are sophisticated, heavy, and consume large amounts of power, thus making them unsuitable for deployment on light weight UAV platforms.

In another related application, illumination munitions have been and continue to be used to illuminate a battlefield or area of interest. The most common illumination rounds used by the U.S. military are 40 mm illumination grenades, 60 mm, 81 mm (such as the M816 IR mortar), 120 mm mortars, and 155 mm illumination artillery rounds. While they are a convenient source of high intensity lighting in various visible and invisible wavelengths, they have many drawbacks. Namely, the chemicals used therein (white phosphorous, cesium nitrate, etc.) are highly toxic and very dangerous, making handling and disposal difficult. Further, they offer limited illumination time because they burn while rapidly falling to earth from a low altitude; illumination durations of approximately 50 seconds to less than two minutes are typical.

In addition, the residual projectile components of traditional illumination rounds are a hazard due to their mass and can cause serious unintentional damage when they eventually fall to earth. Further, because the chemical light may still be burning when it strikes the ground, the burning chemical can initiate unintentional fires when landing on or near flammable material, which is a common occurrence. Another byproduct of a descending light source, such as the traditional M816 illumination mortar, is that the area of illumination produced thereby is non-uniform. Specifically, as the traditional round is a typical point light source with a Gaussian distribution, the area illuminated thereby diminishes rapidly as the round descends. Illuminated areas near the periphery are only visible for a short time as the illuminated area rapidly decreases in size.

In addition to the technical disadvantages of conventional illumination rounds, as discussed above, cost of the current rounds is a major factor when considering use thereof. Because they are not reusable, the above-described conventional illumination rounds is on a per-shot basis, and is typically from several hundred dollars to over one thousand dollars per-shot as of 2010. During a typical engagement, dozens to hundreds of illumination rounds may be employed, which is clearly very costly.

Accordingly, it is an object of the present invention to provide an aerially deployable illumination system capable of overcoming the disadvantages of the conventional illumination means described above. In particular, it is an object of the present invention to provide an aerially deployed illumination system operable to illuminate a designated geographic area with a rapidly scanning, low power, collimated light source.

It is a further object of the present invention to provide such an aerially deployed illumination system mentioned above, wherein the collimated light source is operable to generate graphics, such as shapes, words and images, thereby providing communication functionality.

It is a further object of the present invention to provide such an aerially deployed illumination system with remote, automatic capability, wherein the aerial deployment system is a UAV which can be programmed or remotely commanded to illuminate a designated stationary or geographic area.

It is a further object of the present invention to provide such an aerially deployed illumination system with remote, automatic capability, wherein the aerial deployment system is a UAV, which can be programmed or remotely commanded to illuminate a designated mobile or stationary target (including geographic areas, vehicles, devices and personnel).

It is yet a further object of the present invention to provide such an aerially deployed illumination system having a plurality of UAV's with the capabilities described above, which can be programmed or remotely commanded in real time to illuminate a designated mobile or stationary target, including have the ability to lock on, follow and continuously illuminate designated targets.

It is another object of the present invention to provide such an aerially deployed illumination system having a plurality of UAV's with the capabilities described above, which can form an ad hoc network of UAV's, thereby enabling the network of UAV's to complete a designated mission.

It is yet another object of the present invention to provide a "tube" or gun launched illumination system operable to illuminate a designated geographic area with a rapidly scanning, low power, collimated light source disposed on a "tube" or gun launched UAV, with one or more of the capabilities of the UAV-based system mentioned above.

It is a final object of the present invention to provide a "tube" or gun launched illumination system operable to illuminate a designated geographic area with a rapidly scanning, low power, collimated light source disposed on/in a "tube" or gun launched carrier, such as a parachute-type application employing a parasail, wing or drag increasing device operable to slow the drop rate of the illumination system to increase the loiter time over target.

BRIEF SUMMARY OF THE INVENTION

In order to achieve the objects of the present invention as described above, the present inventor endeavored to develop an aerially deployed illumination system operable to illuminate a target, including geographic areas, vehicles, devices and personnel, with an illumination system preferably comprised of a low power, concentrated (collimated) light source, such as a laser, light emitting diode (LED), DLP™ (digital light processing), galvanometer-based or other low power consuming bulb. In particular, in a first embodiment of the present invention, an aerially deployed illumination system is provided, comprised of:
   (a) an unmanned aerial vehicle (UAV);
   (b) a central microprocessor disposed on the UAV;
   (c) a wireless communication means disposed on the UAV, and in communication with the central microprocessor;
   (d) a geographic location and positioning device in communication with the central microprocessor; and
   (e) an illumination system in communication with the central microprocessor, said illumination system comprised of:
      (i) a collimated light source; and
      (ii) an illumination control device in communication with the collimated light source, said illumination control device operable to control the intensity and orientation of the collimated light source.

In a second embodiment of the present invention, the aerial illumination system of the first embodiment above is provided, further comprising:
   computer application program product operable to run on the central microprocessor, alone or in conjunction with a conventional operating system, comprising:
      (i) mission sequence computer application program code operable to enable reception (input) of a mission sequence, said mission sequence comprised of two or more mission components selected from altitude, vector, time in flight, illumination target identification, illumination target location, illumination intensity, and illumination characteristic; and
      (ii) mission execution computer application program code operable to control operation of the UAV's flight control system and illumination system, so as to implement the mission sequence.

In a third embodiment of the present invention, the aerial illumination system of the first embodiment above is provided, further comprising:
   a system user control and tracking station comprised of:
   a microprocessor,
   a wireless communication device in communication with the microprocessor, and
   command computer application program code operable to enable transmission (output) of a mission sequence, said mission sequence comprised of two or more mission components selected from altitude, vector, time in flight, illumination target identification, illumination target location, illumination intensity, and illumination characteristic.

In a fourth embodiment of the present invention, the aerial illumination system of the third embodiment above is provided, further comprising:
   a GPS (geographic positioning system) receiver in communication with the microprocessor of the system user control and tracking station,
   wherein the system user control and tracking station is mobile.

In a fifth embodiment of the present invention, the aerial illumination system of the fourth embodiment above is provided, further comprising
   computer application program code operable to determine the location of the system user control and tracking station relative to the UAV,
   computer application program code operable to receive a command from a user regarding desired location of the UAV relative to the system user control and tracking station, and
   computer application program code operable to enable transmission of a mission sequence to the UAV, said mission sequence comprising location of the UAV relative to the system user control and tracking station.

In a sixth embodiment of the present invention, the aerial illumination system of the first embodiment above is provided, wherein the collimated light source is comprised of one or more of a visible laser, and IR (infrared) laser.

In a seventh embodiment of the present invention, the aerial illumination system of the first embodiment above is provided, wherein the illumination control device is comprised of one or more of a line image generating apparatus, a light source and light source movement apparatus (such as a mirror galvanometer) comprised of one or more of movable mirrors, a spinning line generator, DLP® (i.e., digital light processing, wherein an image is created by microscopically small mirrors laid out in a matrix on a semiconductor chip, known as a digital micromirror device (DMD), wherein the light source movement apparatus can be designed/commanded to produce a desirable lighting pattern).

In an eighth embodiment of the present invention, the aerial illumination system of the first embodiment above is provided, further comprising a projectile, wherein the UAV is disposed within/on the projectile, such that the UAV is "tube" or gun launchable via the projectile.

In a ninth embodiment of the present invention, a tube or gun launchable aerial illumination system is provided, comprising:
   (a) a projectile;
   (b) a drag increasing device disposed on and/within the projectile, such as a parachute, parasail or wing, said drag increasing device operable to slow drop rate and increase loiter time over a target; and
   (c) an illumination system in communication with the drag increasing device, said illumination system comprised of:
      (i) a collimated light source; and
      (ii) an illumination control device in communication with the collimated light source, said illumination control device operable to control the intensity and orientation of the collimated light source.

The present illumination system is operable to float, hover and/or circle over a target for a fairly extended period of time, and generate/project a rapidly moving beam (spot or line) of collimated light upon the target, thereby creating the illusion of a broad area of constant illumination upon the target via the phenomenon of persistence of vision. Such an illumination system is desirable for deployment on a UAV platform due to the lightweight and low power consumption characteristics of the light source and illumination control device relative to the area of illumination provided thereby.

In a preferred embodiment of the present invention as described above, the UAV is a maneuverable balloon-based (lighter than air) craft, such as an aerostat. In a more preferred embodiment, the UAV is a fixed-wing aircraft, which can be remotely manually operated, pre-programmed and/or remotely automatically commanded. In a most preferred embodiment, the UAV is a rotating-blade equipped aircraft, including but not limited to a single or dual rotor helicopter, which can be remotely manually operated, pre-programmed and/or remotely automatically commanded.

Any of such UAV's may be conventional gas and/or battery powered UAV's, depending upon the desired range and time in flight, and are preferably comprised of a power source, one or more engines/motors in connection therewith, a guidance system, an illumination system, a main microprocessor in communication with the engines/motors, guidance system and illumination system, and wireless transmitter/receiver in communication with the main microprocessor.

Additional aspects of the invention will be set forth in part in the description, which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood however, that the invention is not limited to the precise arrangements and instrumentalities shown, wherein.

DETAILED DESCRIPTION OF THE INVENTION

As mentioned above, generally, both gas and electric powered UAV's have a fairly low payload capacity. Thus, it is important that the UAV-deployed illumination system be lightweight and consume a low amount of power. However, it is equally important to provide a sufficient amount of illumination on a target for proper viewing thereof. Currently, no conventional aerially deployed methods of illumination provide these two characteristics, namely, low mass and high illumination power.

Figure 15:
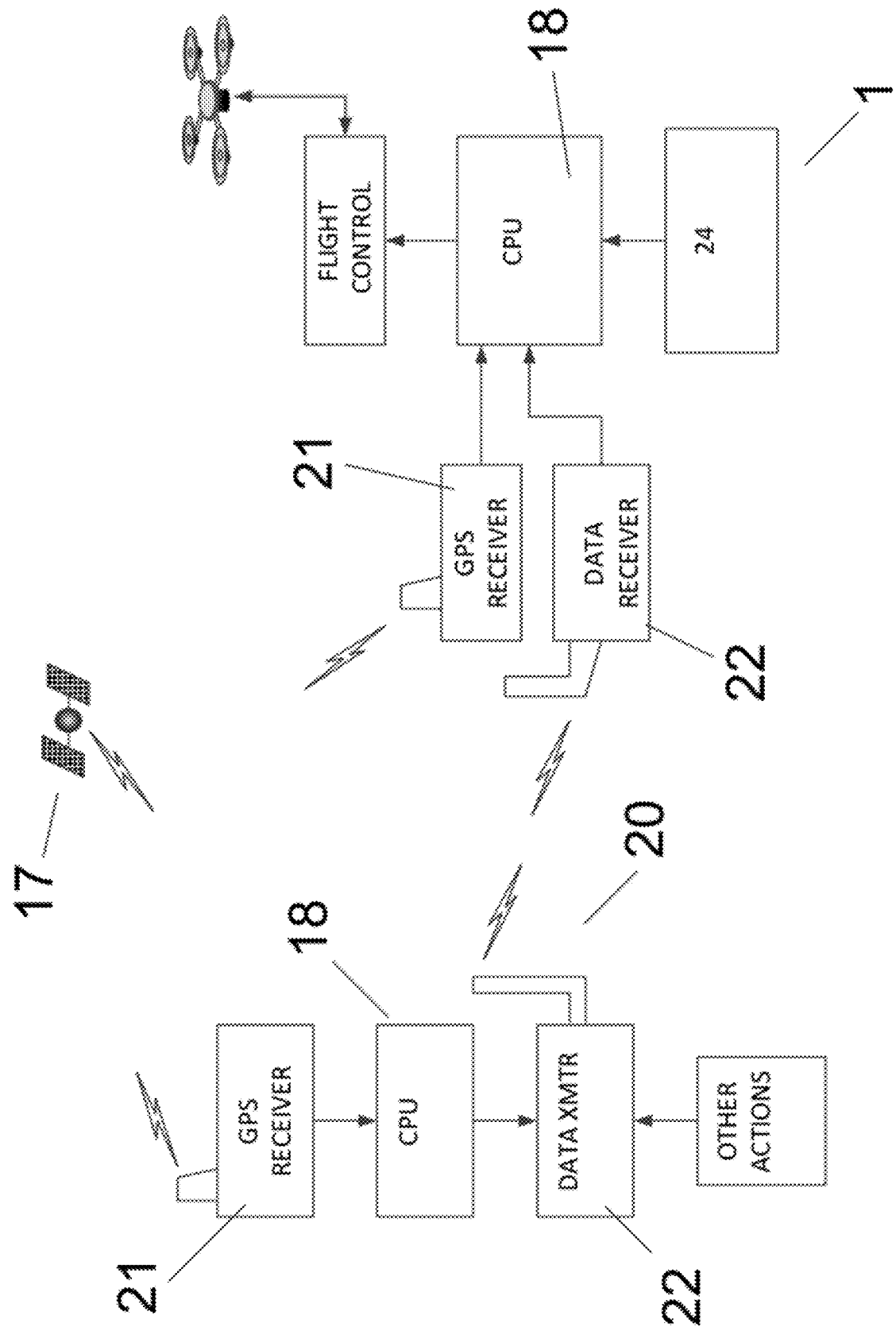
FIG. 15 is a box diagram illustrating the components and connectivity thereof the system of the present invention, including the UAV, system user control and tracking station, and GPS satellite transmitting geographic coordinates to the system components.
Figure 16:
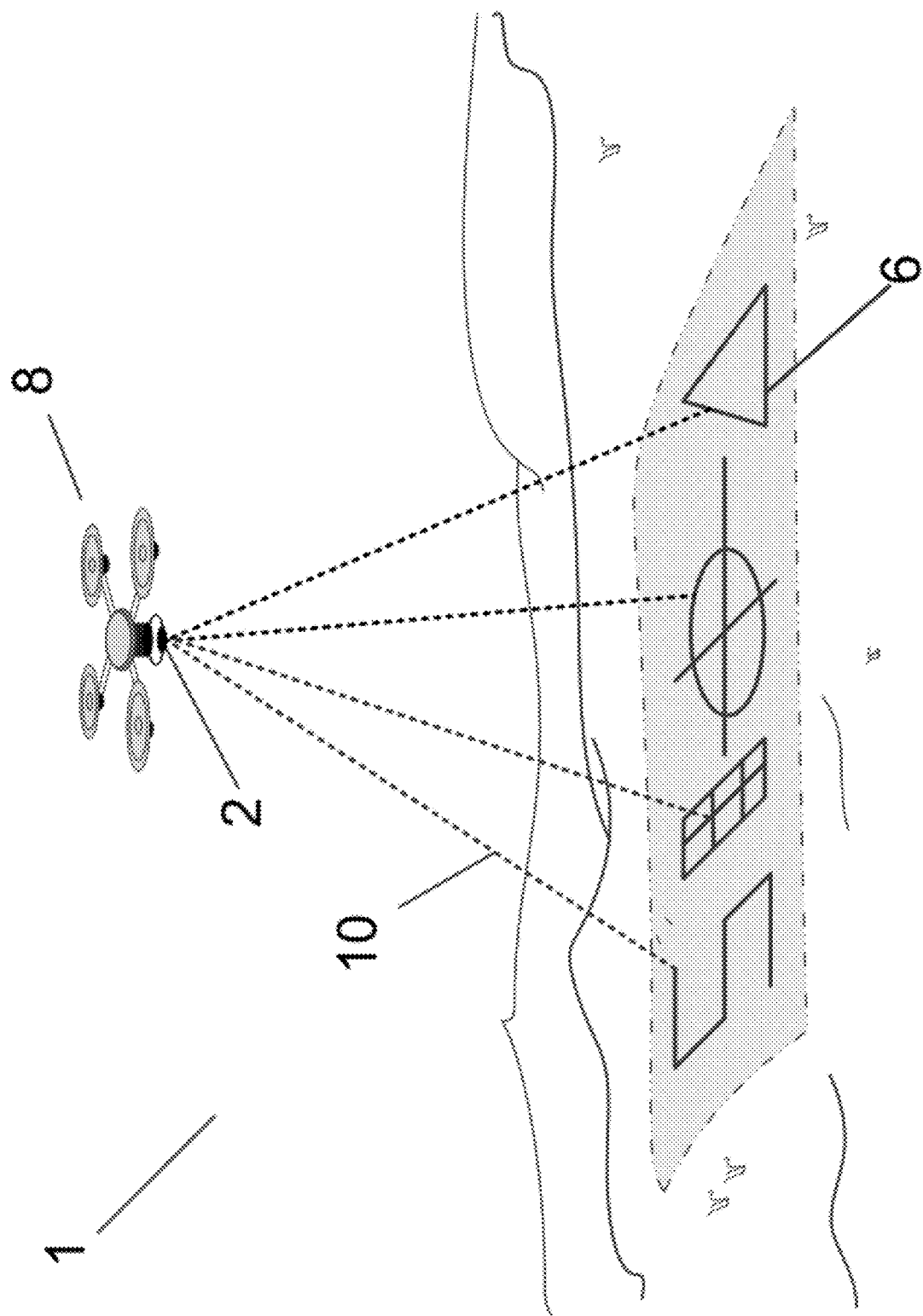
FIG. 16 is a perspective view of the aerially deployed illumination system of the present invention, illustrating the preferred embodiment wherein the illumination system is operable to form images, such as shapes, words and signals, on a target area. Accordingly, the collimated light source may serve as a means of communication, as well as a source of illumination.

To cure these deficiencies, and provide an aerially deployed illumination means which can be disposed on a small UAV and is capable of illuminating a relatively large area, the present inventors have developed an aerially deployed illumination system comprised of one or more unmanned aerial vehicles (UAV's), each of same having an illumination system disposed thereon. In particular, as illustrated in FIG. 15, each UAV 1 is comprised of a central microprocessor 18; a wireless communication means (such as, in this example, a wireless transmitter/receiver 22) in communication with the central microprocessor 18; a geographic location and positioning device (such as a conventional GPS receiver 21) in communication with the central microprocessor 18; and an illumination system in communication with the central microprocessor.

The microprocessor 18 may be any conventional microprocessor capable of executing the mission sequence commands and communicating with a computer storage medium preferably disposed onboard. The guidance system of the UAV is preferably comprised of a GPS receiver 21, as mentioned above, disposed thereon or in remote communication therewith (such as at a ground station), and in communication with the microprocessor 18, such that the system 1 is operable to determine the geographic coordinates (X-Y-Z coordinates) of the UAV during flight.

As shown in FIGS. 1-4, 6, 10-14 and 16, the system 1 can illuminate various targets, including geographic areas, vehicles, personnel, etc., with one or more various types of illumination, including but not limited to visible and IR wavelengths. In a preferred embodiment, the illumination system comprises one or more light sources 2 operable to emit light in two or more wavelength bands, such as visible and IR. In a further related preferred embodiment, the system 1 is operable to enable the user to select the type of illumination (e.g., visible, IR, etc.) as needed during use. For example, in a covert battlefield situation, the user may prefer to utilize an IR light source, so as to conceal the illumination of hostile target from the target itself.

Figure 8:
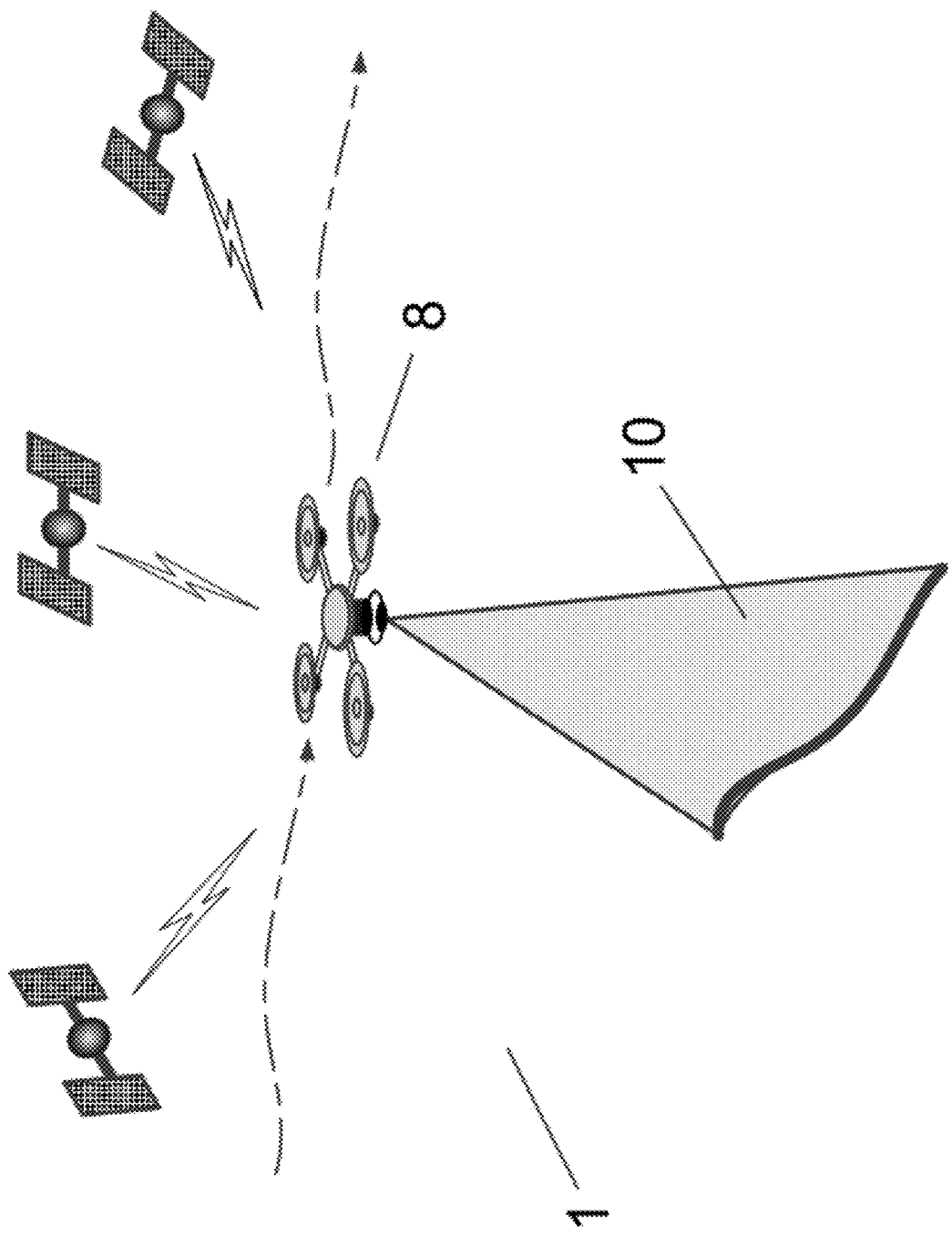
FIG. 8 is a perspective view of the aerially deployed illumination system of the present invention, illustrating the GPS-based positioning capability of the unmanned aerial vehicle.
Figure 9:
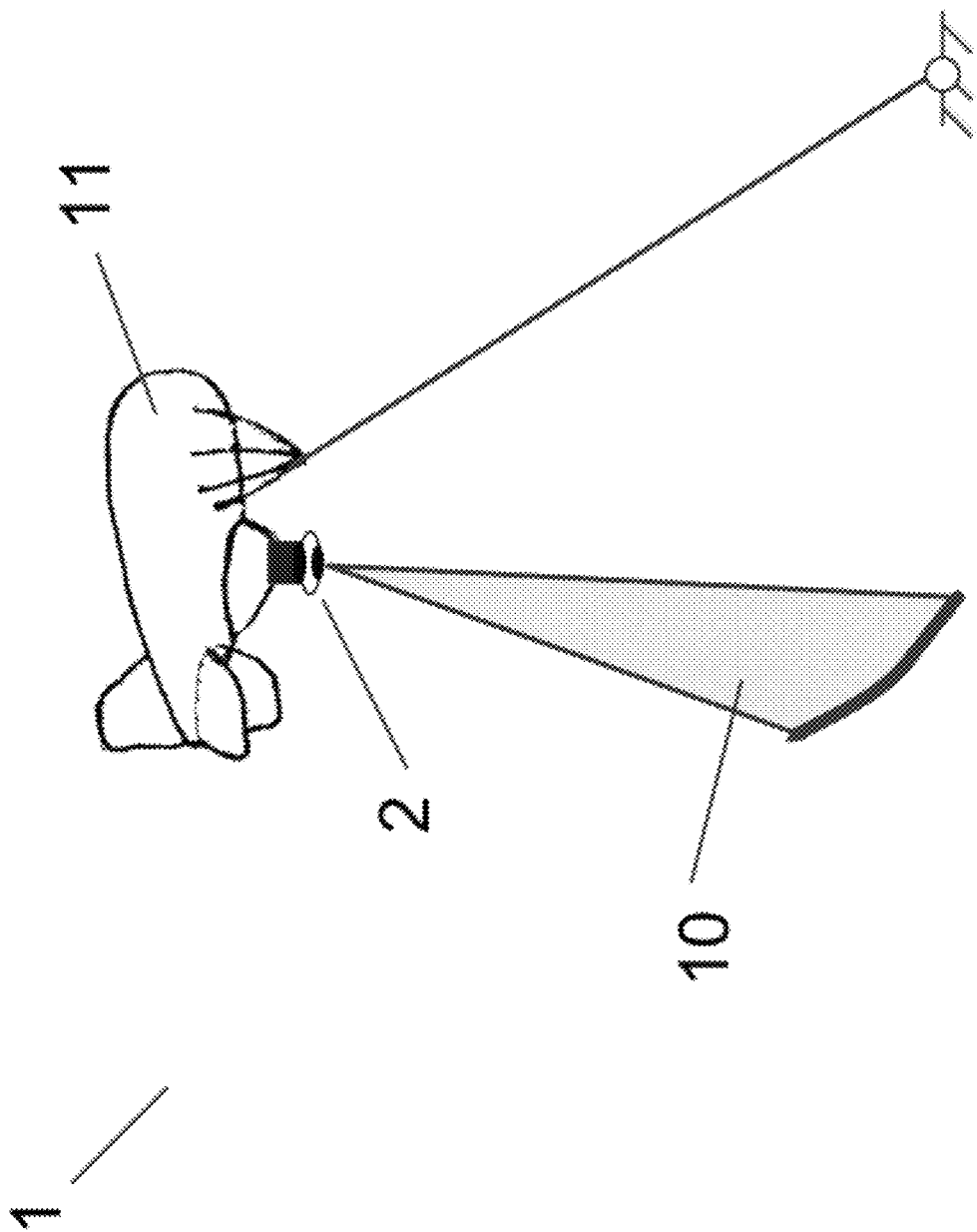
FIG. 9 is a perspective view of the aerially deployed illumination system of the present invention, wherein the UAV is an aerostat, the operation of which is controlled via communication with a ground station.

The UAV 8 may be remotely controlled via satellite relay or ground-based stations, as illustrated in FIGS. 8-9 and 14-5, respectively. Alternatively, or in addition to, remote control capabilities, the UAV may be preprogrammed to perform its mission sequence. Preferably, the UAV is a rotating blade-equipped vehicle, such as a helicopter, as shown in FIGS. 1-4, which can hover over a target area, so as to replace the need for illumination mortars. However, any conventional UAV, including but not limited to fixed-wing craft and aerostats, as shown in FIG. 9, may be utilized, as the aerial platform for the illumination system 2.

Figure 6:
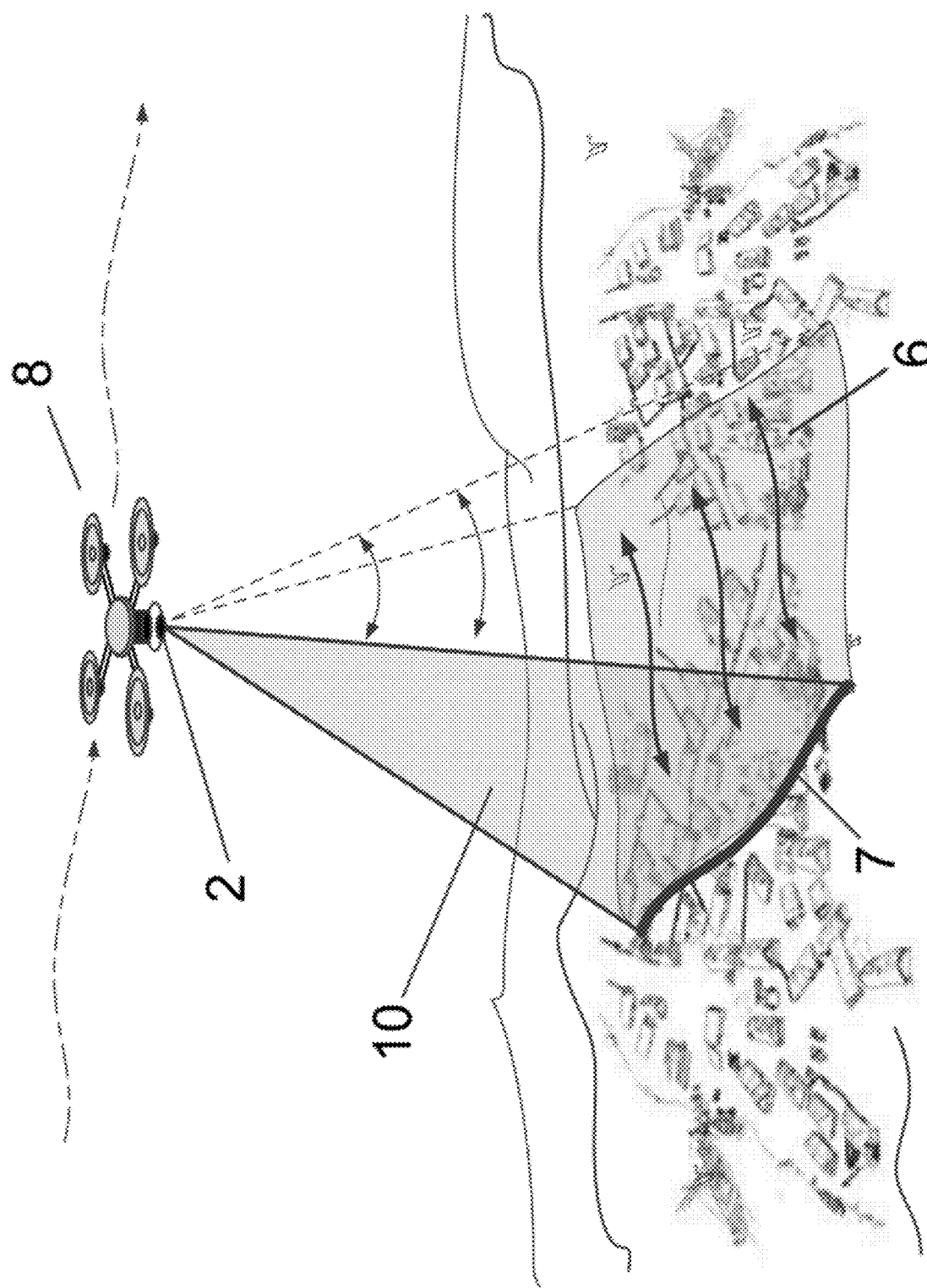
FIG. 6 is a perspective view of the aerially deployed illumination system of the present invention, illustrating same travelling over a landscape so as illuminate the terrain thereof.

Importantly, the UAV 8 has disposed thereon an illumination system 2, which is small in size and mass, yet is capable of illuminating a broad area of illumination 6. Although conventional floodlights, bulbs, etc., are capable of illuminating large area, they consume high amounts of power and are high in mass, and thus incapable of being carried aloft by small UAV's. In order to solve this problem, as illustrated in FIGS. 6-8, the present inventors provide an aerially deployable line image generating apparatus 4, wherein a perceived area of illumination 6 is formed, via the rapid movement of light (in the form of a line) over a target area, such that the rapidity of the scanning (movement) of the collimated light beam creates an illusion of a constant wide area of illumination (based on the phenomenon of persistence of vision).

Figure 7:
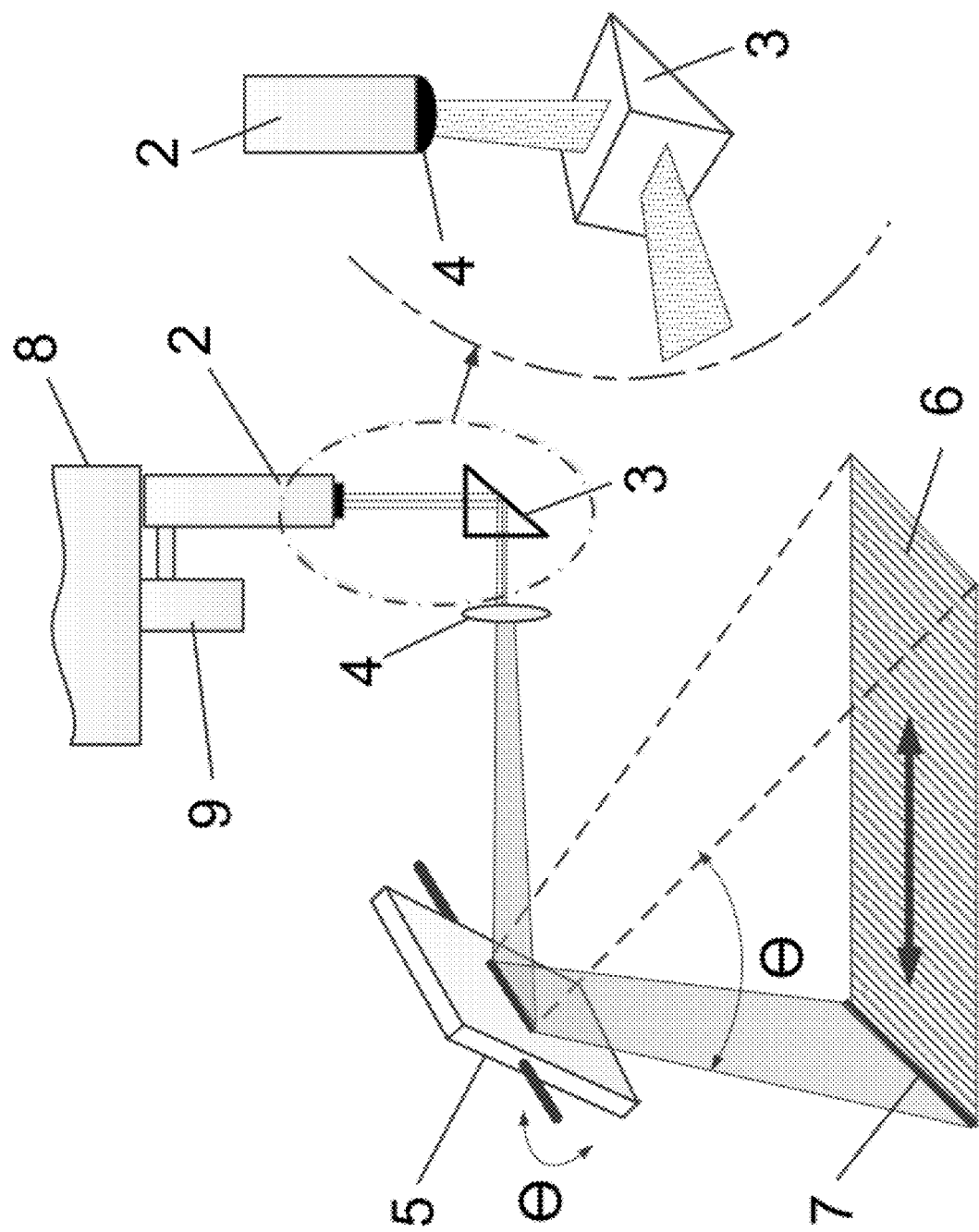
FIG. 7 is a partial perspective view of the illumination system, illustrating a preferred embodiment of the components thereof comprised of a prism, a line generating apparatus and a line moving means utilized to illuminate a target area.

In such a preferred embodiment, as illustrated in FIG. 7, the illumination system is comprised of a collimated light source 2, such as a laser, a line generating apparatus 4 operable to generate a line of illumination (light) 7 from the light source 2, a light movement apparatus 5, and a power source 9 in communication with the line generating apparatus 4. Preferably, the light source is a laser (including white lasers, colored lasers, etc.), LED, or any low power consuming light source, including an IR light source. Further, the light movement apparatus 5 is any conventional means of controlling the orientation of a light source, including but not limited to gimbal apparatuses moving mirrors (such as a galvo), spinning line generators, and MEM's devices (such as DLP® (digital light processing)).

With regards to power output, a typical M816 81 mm IR (infrared) mortar candle is of the order of 75 Watts per steradian (W·s$^{-1}$). This equates to an IR illumination level of about 0.00033 W/m$^2$ from a height of 475 meters to about 0.0075 W/m$^2$ at a height of 100 meters. Using the equivalent power of the 100 m (meter) light level which is very conservative, a uniformly illuminated laser "line" approximately 0.25 m wide×1000 m long or 250 m$^2$ in area, then only requires 250*0.0075=1.9 W of ground power. To create a 2000 m diameter circle of illumination of this same brightness level, the line is moved or spun at the appropriate cycle rate needed for human persistence of vision (POV) principles (0.04 seconds) to be in effect. This is approximately 25 Hz or faster.

A strobe type of effect will appear to be continuous if cycled properly. Even after accounting for POV efficiency losses, using this approach, a much lower energy power source can be employed to appear like a large energy source. It also avoids the hazards of high laser power levels. Further, one or more altimeters are preferably disposed on the UAV 8 in communication with the microprocessor 18, and disposed in communication with the illumination system, so as to enable the microprocessor to determine the altitude of the UAV and cease illumination when the UAV 8 is determined to be lower (or higher) than some predetermined altitude above ground or target, thereby limiting power consumption by turning off the illumination means when it would be ineffective and/or a eye safety hazard.

Figure 1:
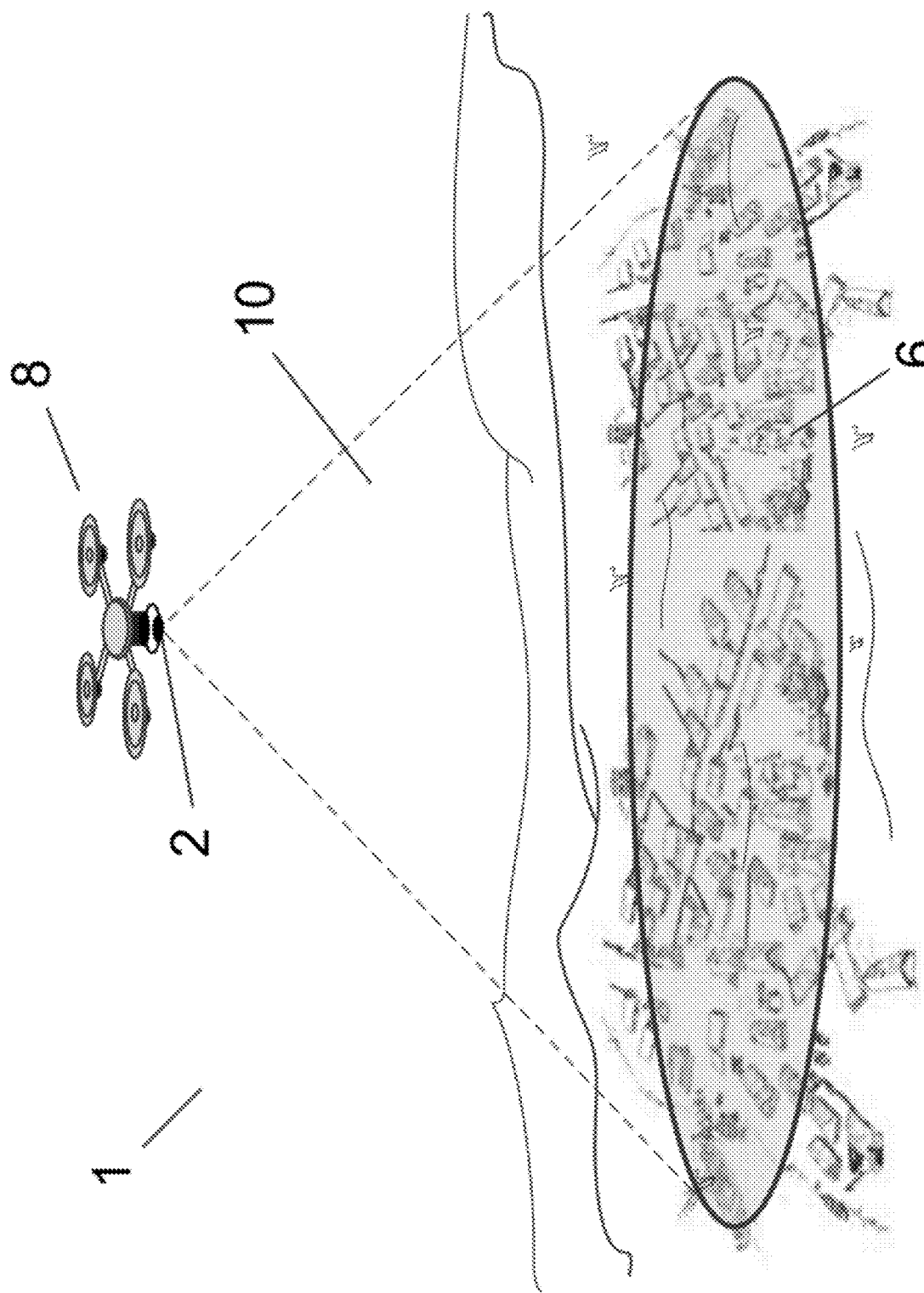
FIG. 1 is a perspective view of the aerially deployed illumination system of the present invention, illustrating a single heli-UAV-deployed illumination system illuminating a circular target area by rapidly rotating a line (collimated light source) upon the target area.
Figure 2:
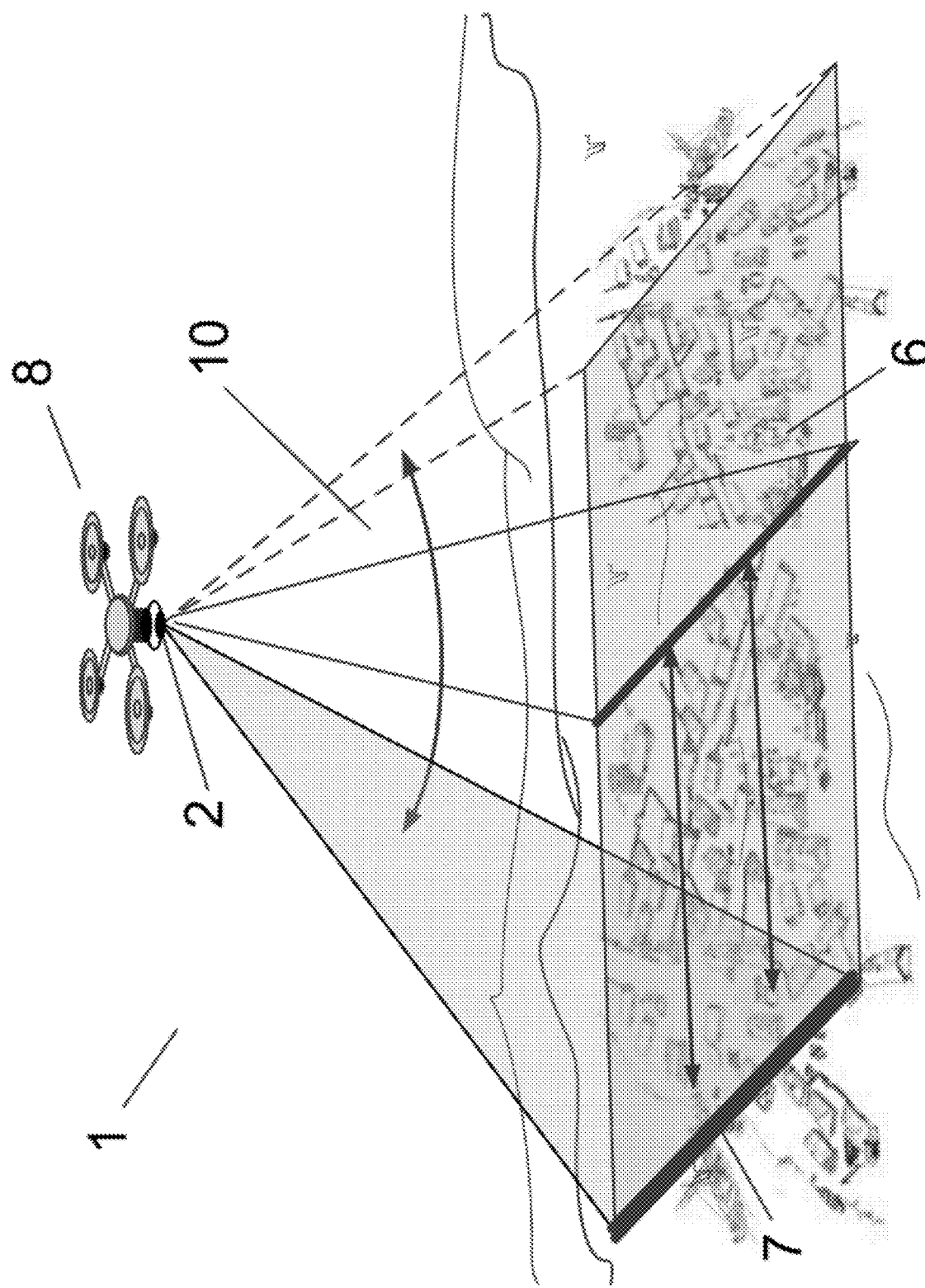
FIG. 2 is a perspective view of the aerially deployed illumination system of the present invention, illustrating a single heli-UAV-deployed illumination system illuminating a square or rectangular area of a illumination via a rapidly scanned line generating apparatus.
Figure 3:
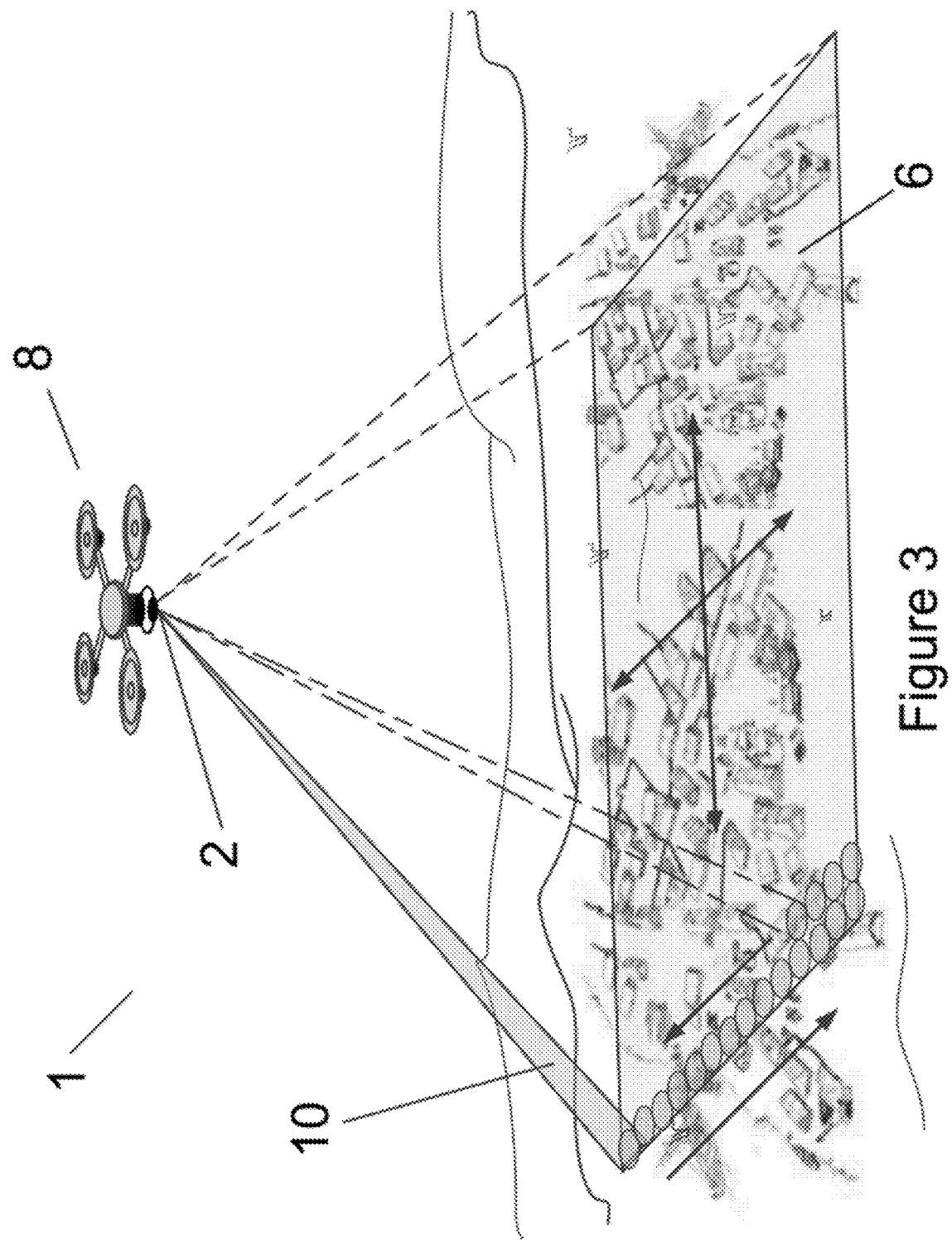
FIG. 3 is a perspective view of the aerially deployed illumination system of the present invention shown in FIG. 2, illustrating the illumination of a target area by same using a rapid repetitive x-y movement of the light source over a broad area so as to form a large area of illumination.
Figure 4:
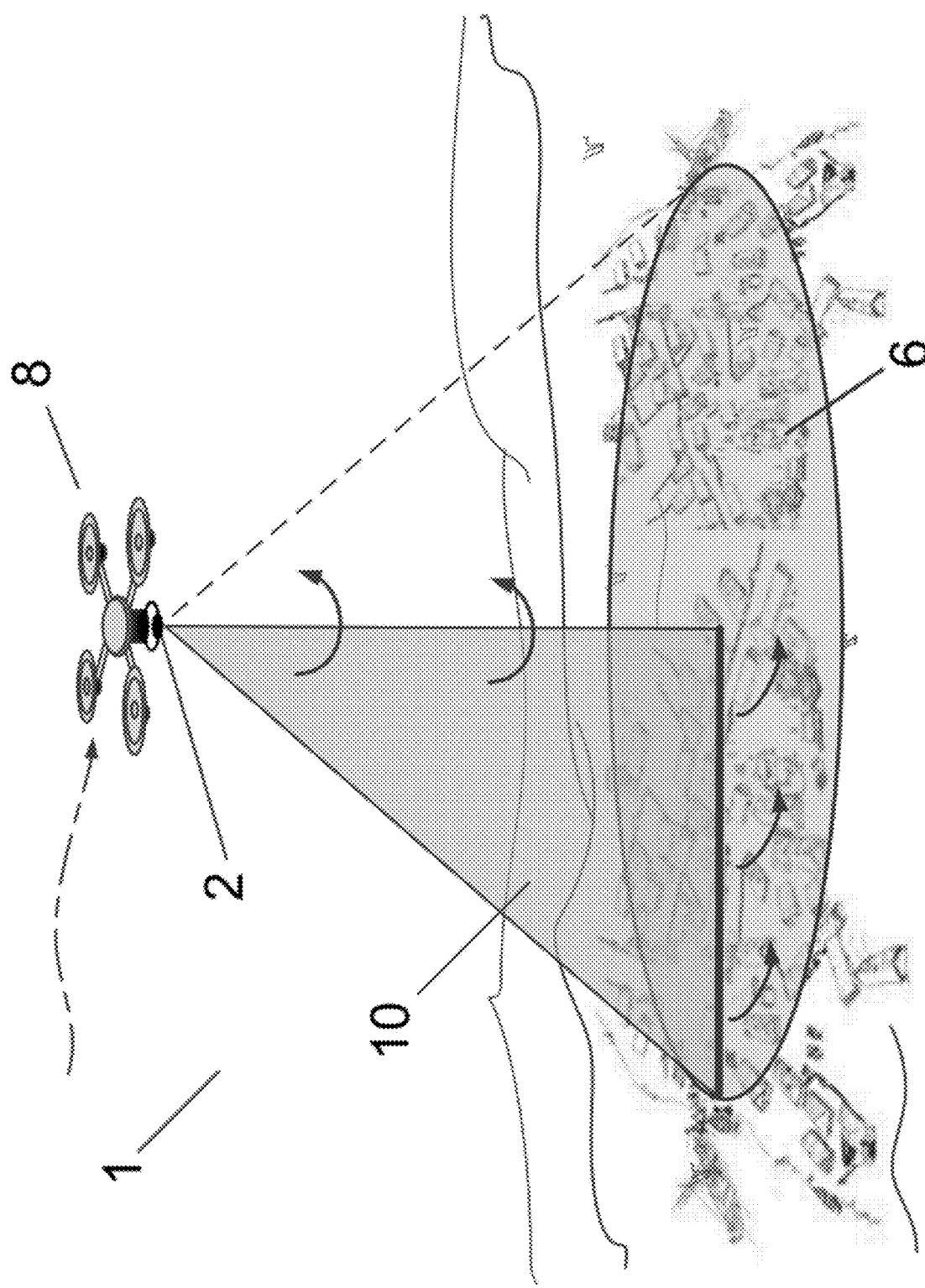
FIG. 4 is a perspective view of the aerially deployed illumination system of the present invention shown in FIGS. 2-4, illustrating the illumination of a target area by same using a rapid circular movement of the line over a broad area so as to form a perceived large circular area of illumination.
Figure 5:
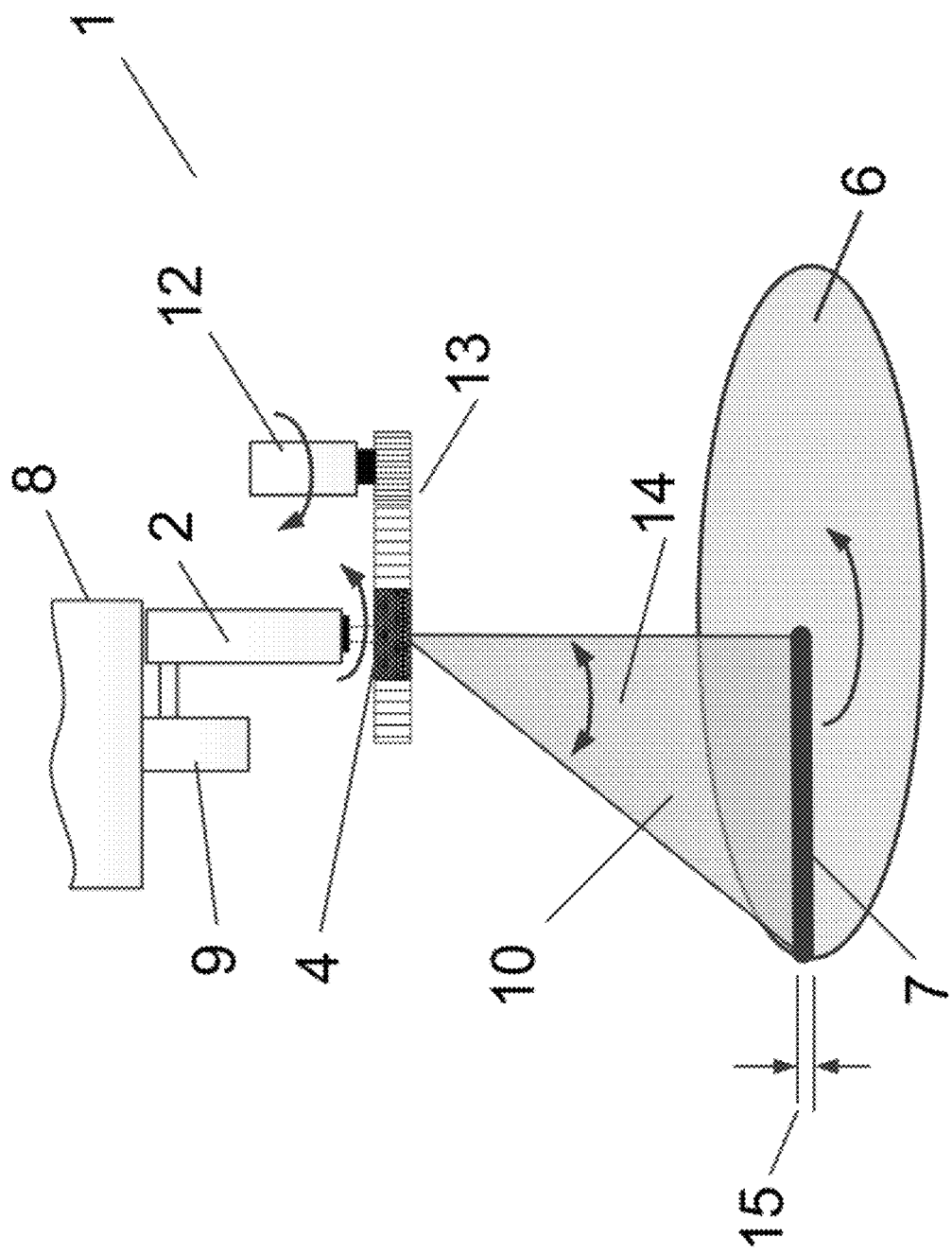
FIG. 5 is a partial perspective view of the aerially deployed illumination system of the present invention as partially shown in FIG. 4, illustrating a preferred embodiment of the components of the illumination system utilized in generating a circularly rotating line upon the target area.

In one preferred embodiment, as illustrated in FIG. 5, the line generating apparatus 4 is spun/driven by a one or more gears 13, the gear 13 being driven by motor 12. In another preferred embodiment, as illustrated in FIG. 7, the collimated light emitted by the light source 2 is reflected by a prism 3, and directed to a line generating apparatus 4. The light movement apparatus 5, such as a rotating/mechanically driven mirror as shown in FIG. 5, then rapidly scans the line 7 over the target-illuminated area 6.

Figure 10:
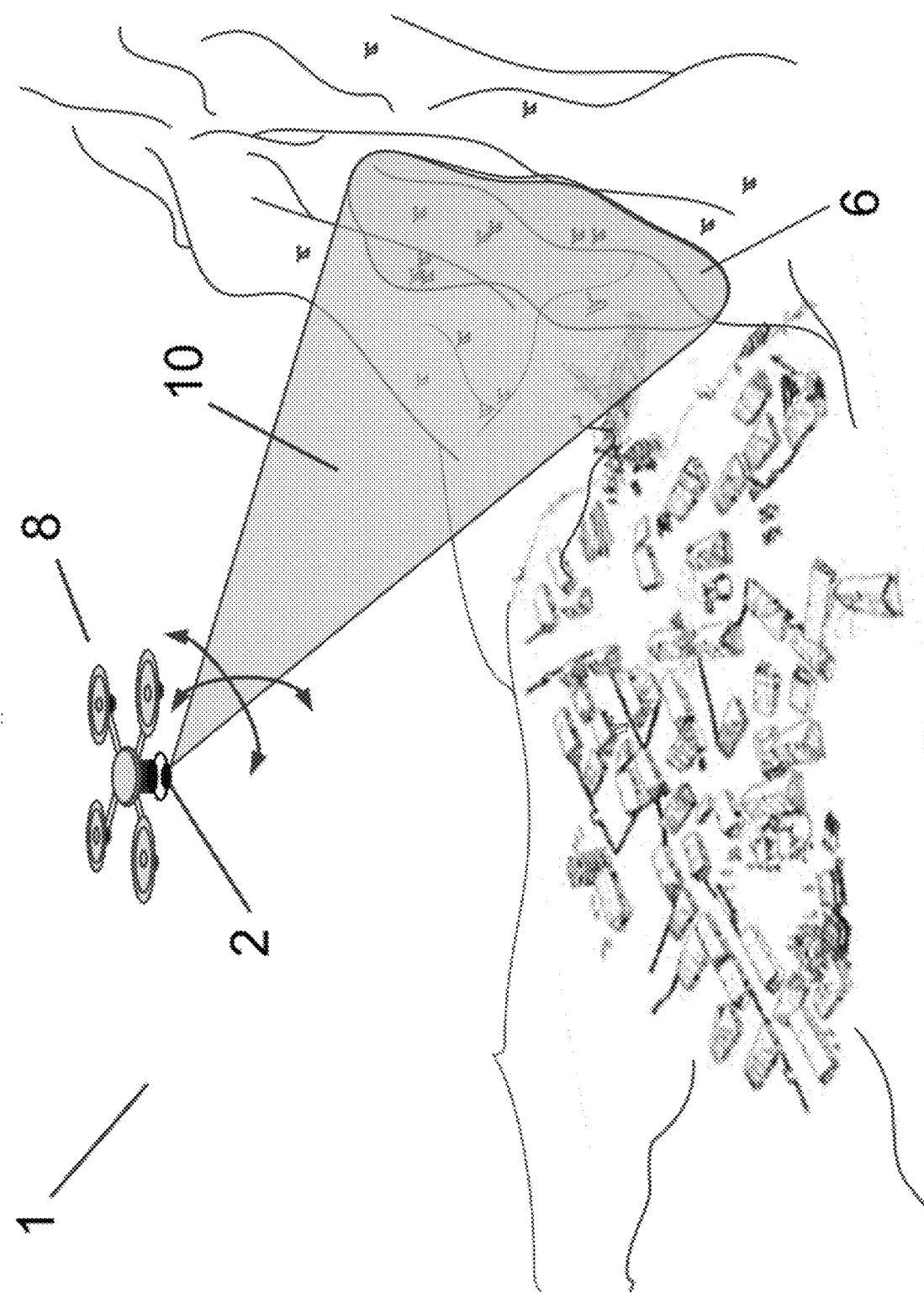
FIG. 10 is a perspective view of the aerially deployed illumination system of the present invention, illustrating the illumination system being gimbal mounted upon the UAV so as to enable wide movement of the beam of illumination, and thereby aiming of the illumination system upon a specific location.

In a preferred embodiment, the system comprises a computer program product executable by the microprocessor 18, which is operable to receive input of a target location, vehicle or personnel, orient the UAV in a location adjacent same, and control the illumination system so as to illuminate the target with a rapidly scanned line, circularly spinning light beam, etc., as shown in FIGS. 1-6. In a further preferred embodiment, as illustrated in FIG. 10, the computer program product is operable to control orientation of the illumination system, such as a gimbal mounted illumination system, such that virtually any target within a 360° radius from the UAV 8 can be illuminated. In another preferred embodiment, the computer program product is operable to receive target coordinates in real time, and rapidly determine and executed appropriate movements for the UAV and illumination system needed to maintain a moving target within an area of illumination, or maintain an area of illumination at a predetermined distance relative to a system user, as illustrated in FIG. 14.

In particular, in a preferred embodiment of the present invention, mission sequence computer application program code operable to enable reception (input) of a mission sequence is provided, wherein the mission sequence comprised of two or more mission components (i.e., data packets) selected from altitude data, vector data, time in flight data, illumination target identification data, illumination target location data, illumination intensity data, and illumination characteristic data. This mission sequence is executed by the microprocessor so as to control the movement of the UAV and illumination system in any manner desired by the user, i.e., to implement the mission sequence.

Figure 14:
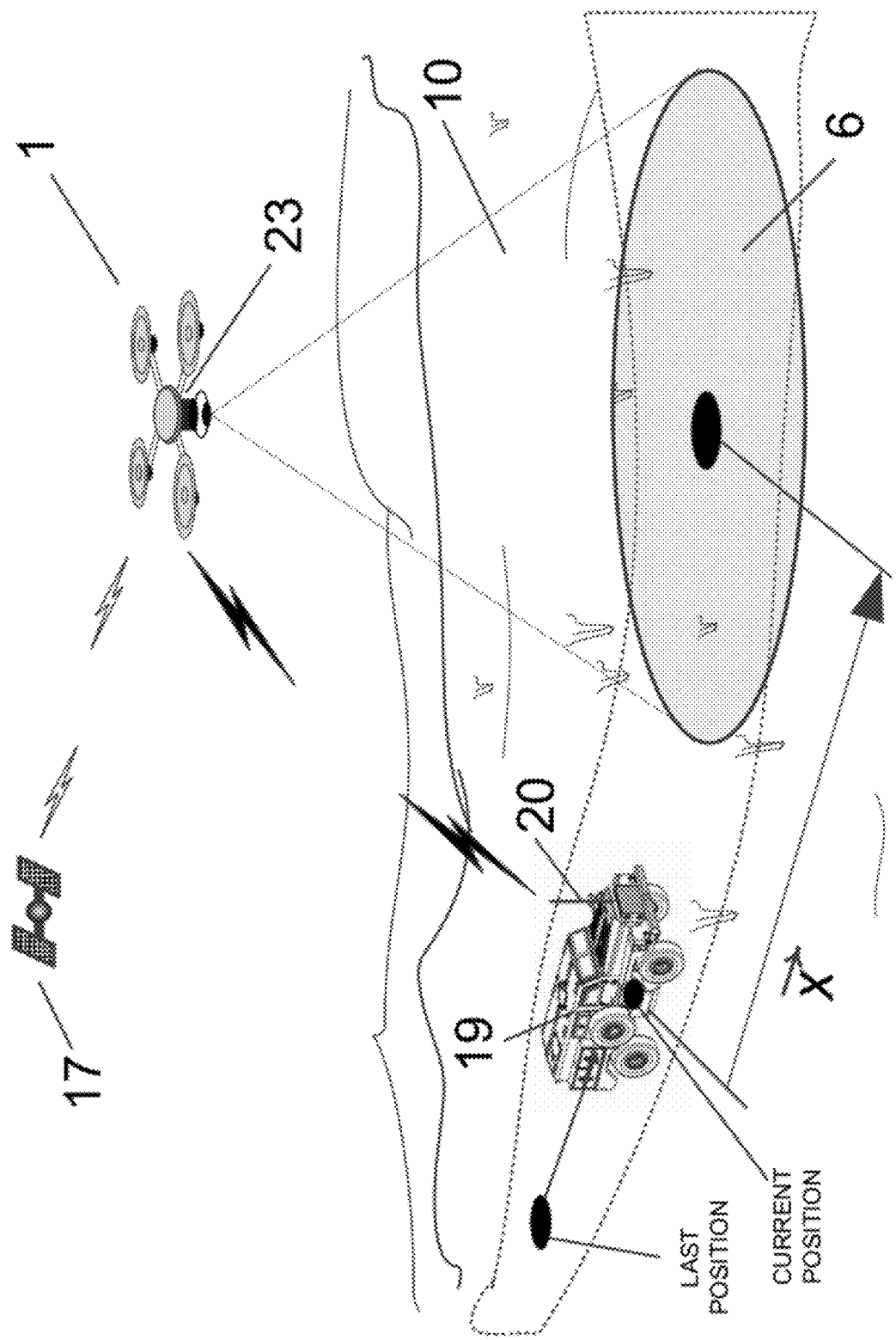
FIG. 14 is a perspective view of an aerially deployed illumination system of the present invention in "follow me" mode, illustrating a single heli-UAV-deployed illumination system performing a mission sequence transmitted by a mobile (vehicle borne) system user control and tracking station, wherein the UAV is illuminating a circular target area by rapidly rotating a line (collimated light source) upon an area in front of the vehicle.

In addition, in another preferred embodiment, command computer application program code operable to enable transmission (output) of a mission sequence is provided for execution by the microprocessor 18 disposed on or in communication with the system user control and tracking station 20, as illustrated in FIGS. 14 and 15. As mentioned above, the mission sequence is comprised of two or more mission components selected from altitude, vector, and time in flight, illumination target identification, illumination target location, illumination intensity, and illumination characteristic. Accordingly, the command computer application program code allows a system user to designate a stationary target for illumination, as shown in FIGS. 1-4, a moving target/area of illumination, such as illustrated in FIG. 6, or even the system user itself or an area adjacent thereto, as illustrated in FIG. 14.

Specifically, FIG. 14 illustrates a "follow me" functionality of the system, wherein the command computer application program is operable to transmit a command to the UAV 8 ordering the UAV 8 to, for example, illuminate an area "x" distance at all times ahead of the system user in a moving vehicle 19. This is achieved by periodically transmitting the geolocation of the system user tracking and control station 20 to the UAV 8. The UAV microprocessor 8, executing the command computer application program code, compares its own known geolocation to the most recently received geolocation of the station 20, and adjusts its orientation (geolocation) to maintain a fixed location directly over the carrier or some offset distance "x" as commanded.

In addition, a "panic" function is preferably provided, to allow a system user to send a preprogrammed command to the UAV in urgent, emergency, hostile or life threatening situation. In particular, the computer application program code is operable to enable a user to quickly transmit a preprogrammed command to the UAV 8, ordering the illumination system to cease illumination, or commanding the UAV 8 to move higher, farther away from the station 20, to land, etc. Thus, in the event that an emergency, hostile or life-threatening situation arises, such an attack on the user by enemy forces, illumination, which may aid the enemy in locating the user, may be quickly ceased.

Figure 11:
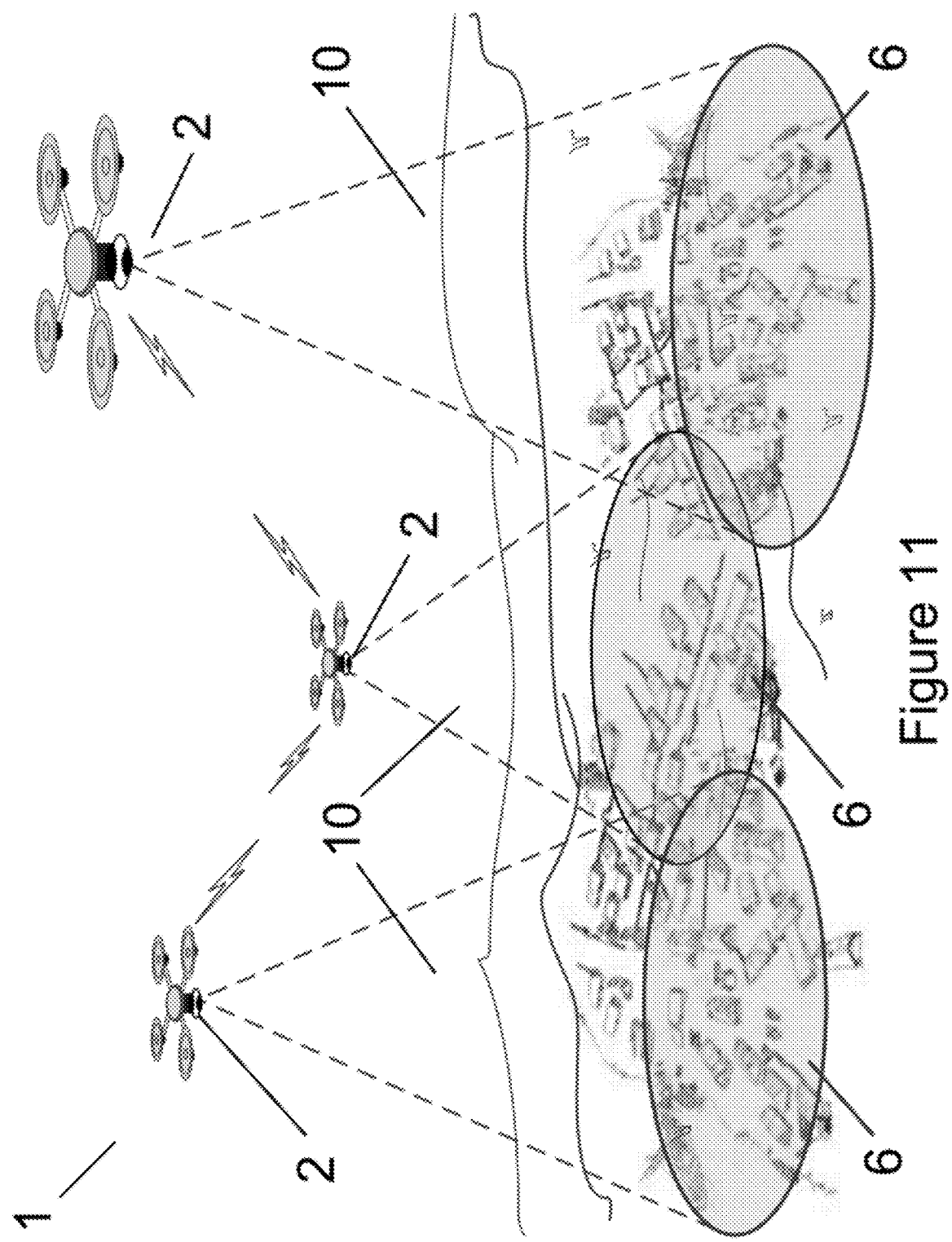
FIG. 11 is a perspective view of the aerially deployed illumination system of the present invention, illustrating the preferred embodiment wherein the system comprises a plurality of UAV's, each of which is preferably in communication with one or more other UAV's in the system so as to cooperate in illuminating a designated target area of illumination.

As mentioned above, the system of the present invention may comprise a plurality of aerially deployed illumination systems, as illustrated in FIG. 11, enabling illumination of a much larger area than one UAV-based system is capable of. The UAV's preferably are operable to communicate with each other, so as to form an ad hoc network of UAV's.

Figure 12:
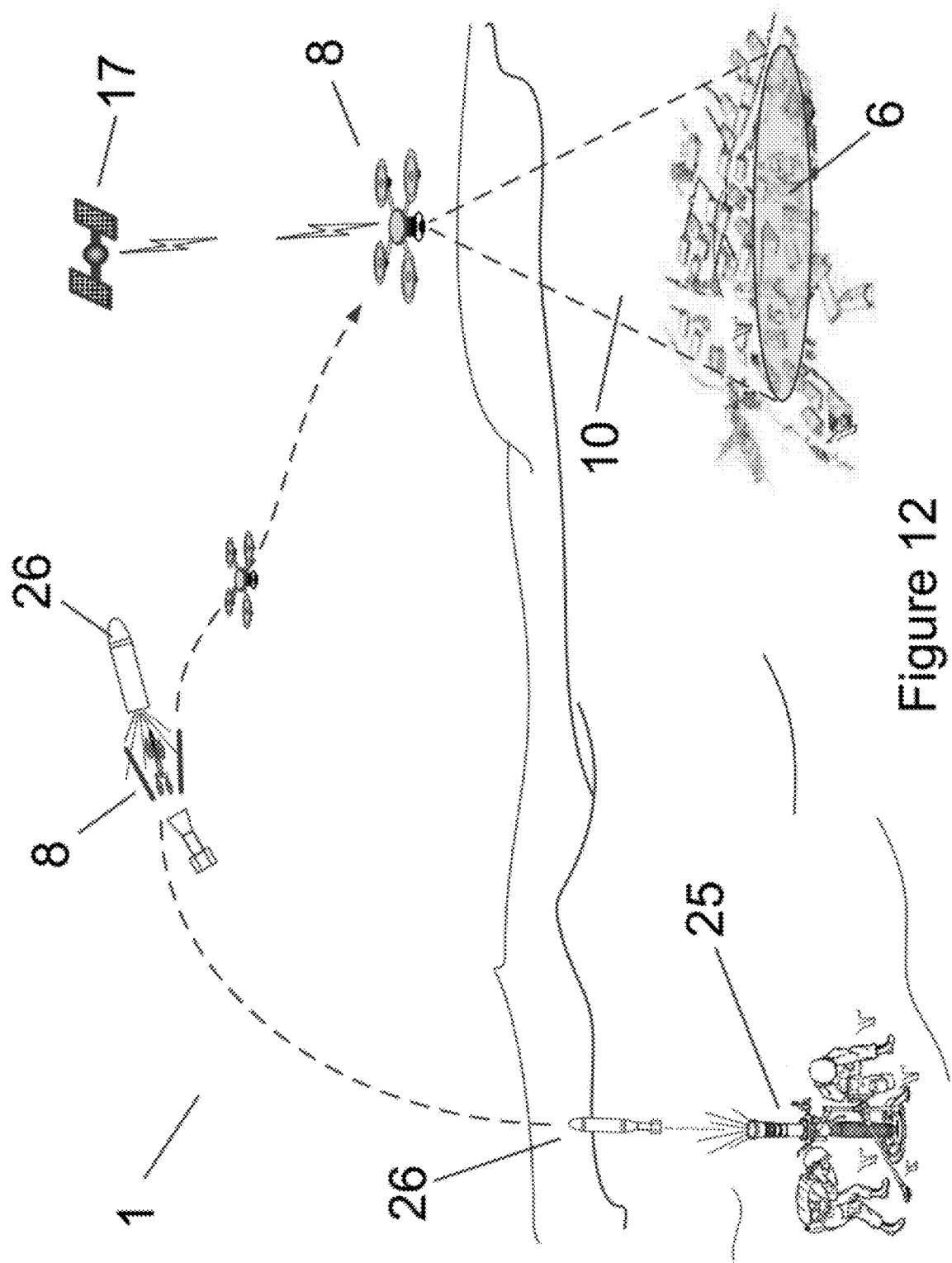
FIG. 12 is a perspective view of a mortar ("tube") launched embodiment of the aerially deployed illumination system of the present invention, illustrating a projectile ejected single heli-UAV-deployed illumination system illuminating a circular target area by rapidly rotating a line (collimated light source) upon the target area.
Figure 13:
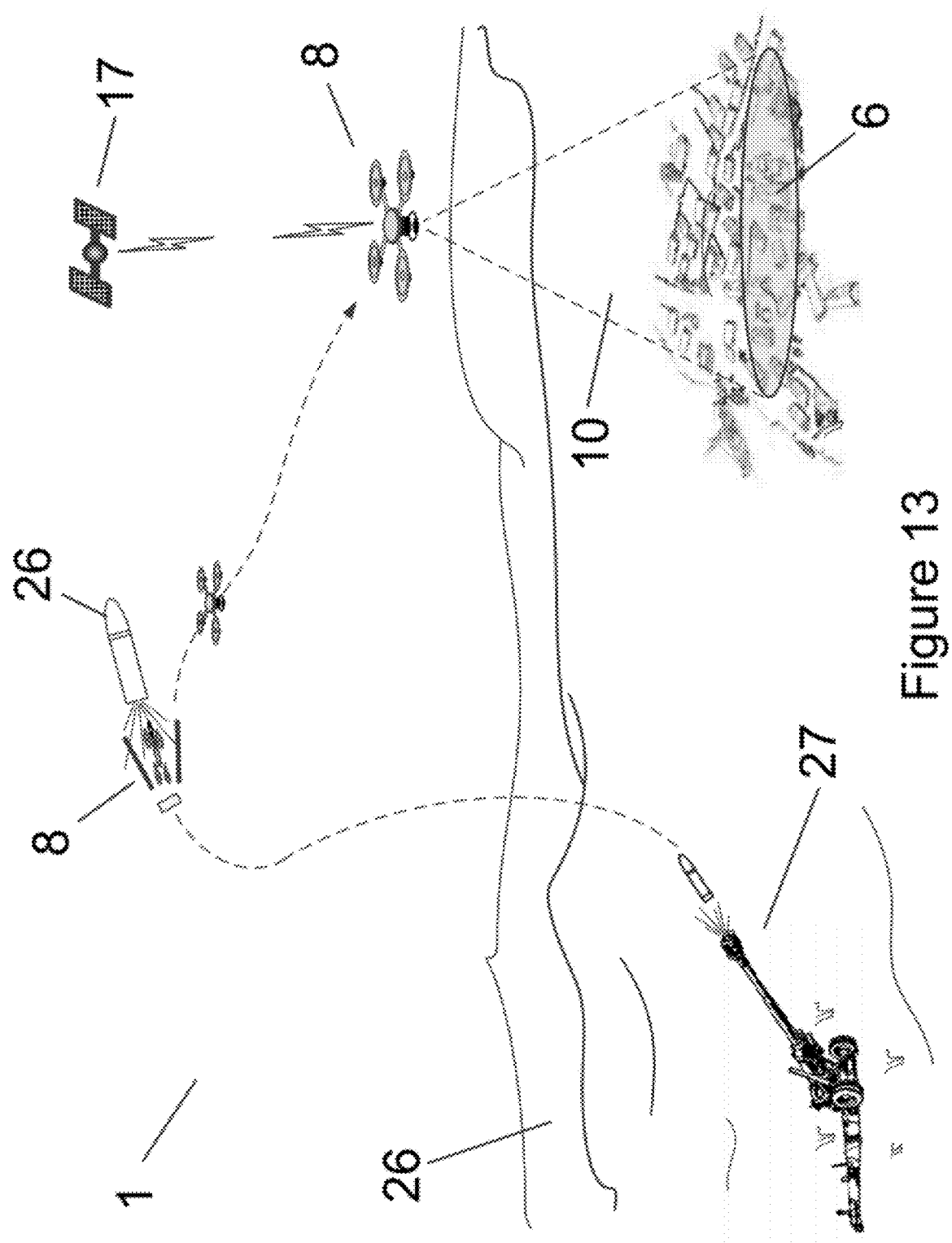
FIG. 13 is a perspective view of a gun (e.g. artillery gun) launched embodiment of the aerially deployed illumination system of the present invention, illustrating a single heli-UAV-deployed illumination system ejected from an artillery launched projectile, wherein the illumination system is illuminating a circular target area by rapidly rotating a line (collimated light source) upon the target area.

In a further preferred embodiment, as illustrated in FIGS. 12 and 13, the UAV 8 of the system of the present invention, can be "tube" or gun launched. In particular, as shown in FIG. 12, a mortar 25 (i.e., a "tube" launched device) can be utilized to launch a projectile 26, wherein the projectile 26 acts as a carrier for the UAV 8. At a predetermined altitude, distance from the mortar 25 and/or time after firing, the UAV 8 is ejected from the projectile 26, and begins to perform its mission sequence as described above. In a related application, as illustrated in FIG. 13, the projectile 26 is fired from an artillery gun 27, and at a predetermined altitude, distance from the gun 27 and/or time after firing; the UAV 8 is ejected from the projectile 26, and begins to perform its mission sequence as described above. In both of the above mentioned applications, the UAV and all components disposed therein/thereon are ruggedized to withstand the shock and g-forces experienced during the firing event.

Figure 17:
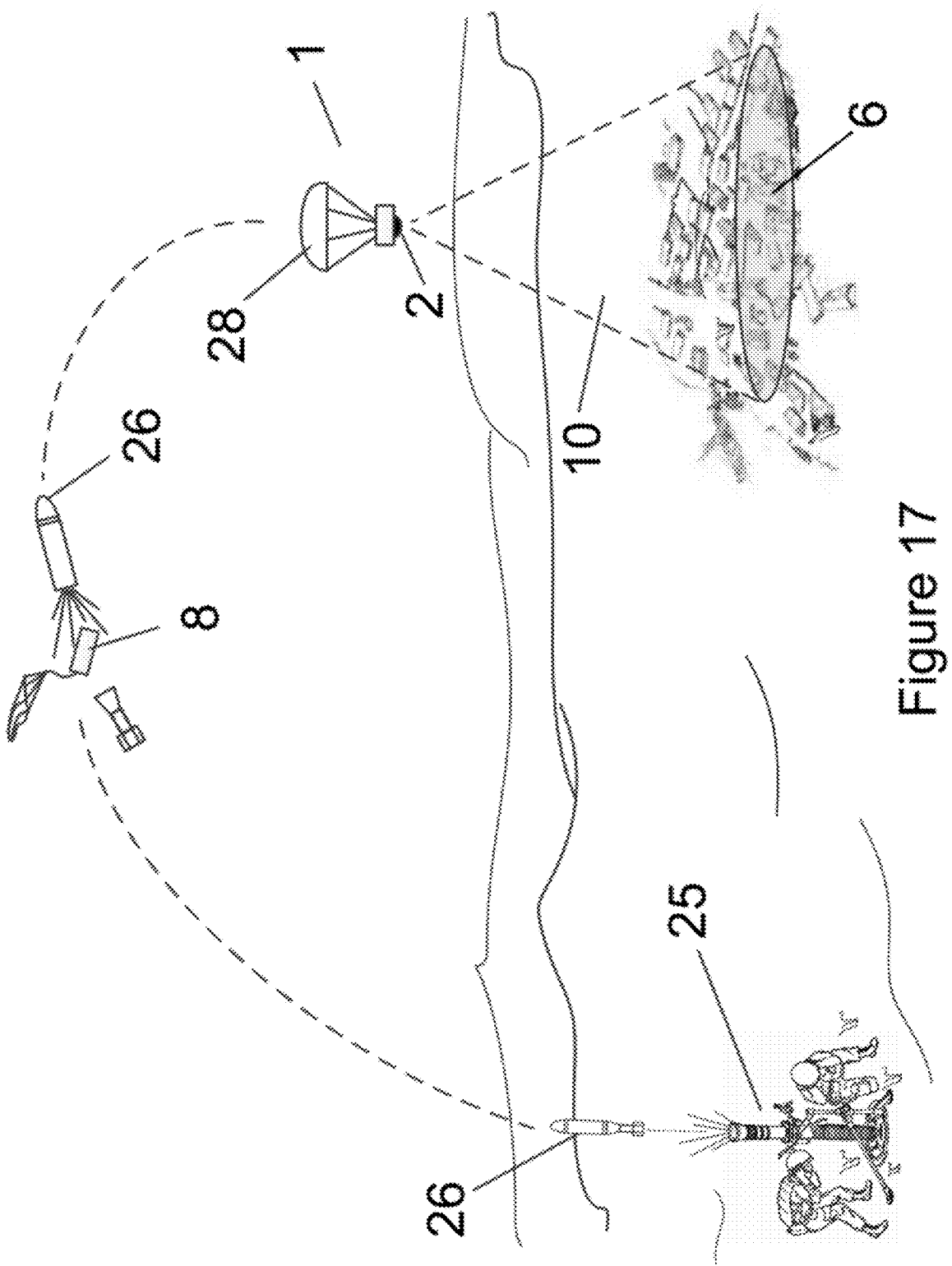
FIG. 17 is a perspective view of a mortar ("tube") launched embodiment of the aerially deployed illumination system of the present invention, illustrating a projectile ejected parachute equipped illumination system illuminating a circular target area by rapidly rotating a line (collimated light source) upon the target area.

In yet a further embodiment, as illustrated in FIG. 17, a mortar ("tube") or gun launched embodiment of the aerially deployed illumination system of the present invention is provided, comprising a projectile 26, a drag increasing device disposed on and/within the projectile, such as a parachute 28, parasail or wing, and an illumination system in communication with the drag increasing device (such as parachute 28), wherein the drag increasing device increases loiter time over the target. As in the embodiments above, the illumination system is comprised of a collimated light source, and an illumination control device in communication with the collimated light, the illumination control device being operable to control the intensity and orientation of the collimated light source.

Although specific embodiments of the present invention have been disclosed herein, those having ordinary skill in the art will understand that changes can be made to the specific embodiments without departing from the spirit and scope of the invention. Thus, the scope of the invention is not to be restricted to the specific embodiments. Furthermore, it is intended that the appended claims cover any and all such applications, modifications, and embodiments within the scope of the present invention.

LIST OF DRAWING ELEMENTS

1: aerially deployed illumination system
2: light source
3: prism or mirror
4: line generator
5: light moving means
6: illuminated area
7: line on surface
8: unmanned aerial vehicle (UAV)
9: power source
10: light emission
11: aerostat
12: motor
13: gears on transmission
14: line angle
15: line width
17: GPS satellite
18: microprocessor
19: vehicle
20: system user control and tracking station
21: GPS receiver
22: wireless receiver/transmitter 24: altimeter
25: mortar
26: projectile
27: artillery gun
28: parachute

What is claimed is:

1. An aerially deployed illumination system comprising:
   (a) an unmanned aerial vehicle (UAV);
   (b) a central microprocessor disposed on the UAV;
   (c) a wireless communication means disposed on the UAV, and in communication with the central microprocessor;
   (d) a geographic location and positioning device in communication with the central microprocessor; and
   (e) an illumination system in communication with the central microprocessor, said illumination system comprised of:
      (i) a collimated light source; and
      (ii) an illumination control device in communication with the collimated light source, said illumination control device operable to control the intensity and orientation of the collimated light source.

2. The aerial illumination system of claim 1, further comprising:
   computer application program product operable to run on the central microprocessor, alone or in conjunction with a conventional operating system, comprising:
      (i) mission sequence computer application program code operable to enable reception (input) of a mission sequence, said mission sequence comprised of two or more mission components selected from altitude, vector, time in flight, illumination target identification, illumination target location, illumination intensity, and illumination characteristic; and
      (ii) mission execution computer application program code operable to control operation of the UAV's flight control system and illumination system, so as to implement the mission sequence.

3. The aerial illumination system of claim 1, further comprising:
   a system user control and tracking station comprised of:
      a microprocessor,
      a wireless communication device in communication with the microprocessor, and
      command computer application program code operable to enable transmission (output) of a mission sequence, said mission sequence comprised of two or more mission components selected from altitude, vector, time in flight, illumination target identification, illumination target location, illumination intensity, and illumination characteristic.

4. The aerial illumination system of claim 3, further comprising:
   a GPS (geographic positioning system) receiver in communication with the microprocessor of the system user control and tracking station,
   wherein the system user control and tracking station is mobile.

5. The aerial illumination system of claim 4, further comprising
   computer application program code operable to determine the location of the system user control and tracking station relative to the UAV,
   computer application program code operable to receive a command from a user regarding desired location of the UAV relative to the system user control and tracking station, and
   computer application program code operable to enable transmission of a mission sequence to the UAV, said mission sequence comprising location of the UAV relative to the system user control and tracking station.

6. The aerial illumination system of claim 1, wherein the collimated light source is comprised of one or more of a visible laser, and IR (infrared) laser.

7. The aerial illumination system of claim 1, wherein the illumination control device is comprised of one or more of a line image generating apparatus, a light source and light source movement apparatus (such as a mirror galvanometer) comprised of one or more of movable mirrors, a spinning line generator, and DLP®.

8. The aerial illumination system of claim 1, further comprising a projectile, wherein the UAV is disposed within the projectile, so as to be operable to be tube or gun launchable.

9. A tube or gun launchable aerial illumination system, comprising:
   (a) a projectile;
   (b) a drag increasing device disposed on and/within the projectile, said drag increasing device operable to slow drop rate and increase loiter time over a target; and
   (c) an illumination system in communication with the drag increasing device, said illumination system comprised of:
      (i) a collimated light source; and
      (ii) an illumination control device in communication with the collimated light source, said illumination control device operable to control the intensity and orientation of the collimated light source.

* * * * *